C. YOUNG.
COLLAR FOR DRAFT ANIMALS.
APPLICATION FILED SEPT. 9, 1909.
975,920.
Patented Nov. 15, 1910.
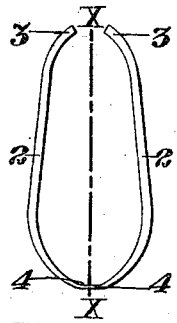 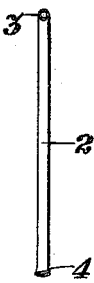 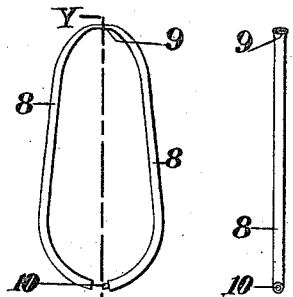
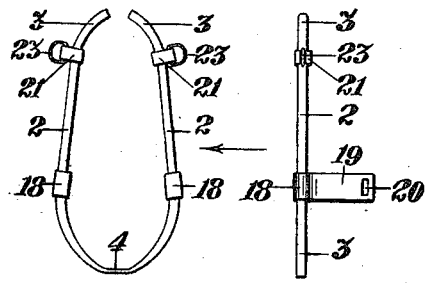
 
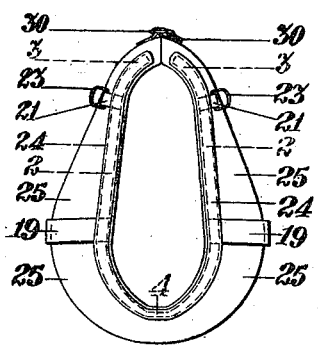 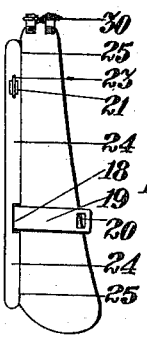 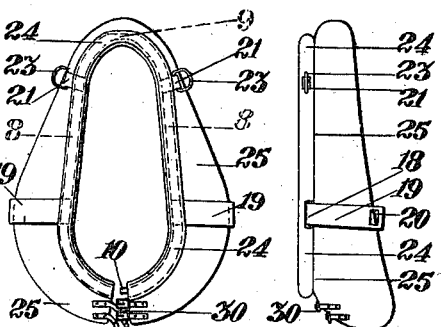
Witnesses:
James H. Mansfield
L. E. Witham
Inventor:
Courtland Young
By Alexander Sewell
Attorneys

UNITED STATES PATENT OFFICE.

COURTLAND YOUNG, OF EVANSFORD, LEXTON, VICTORIA, AUSTRALIA.

COLLAR FOR DRAFT-ANIMALS.

975,920.  Specification of Letters Patent.  Patented Nov. 15, 1910.

Application filed September 9, 1909. Serial No. 516,979.

*To all whom it may concern:*

Be it known that I, COURTLAND YOUNG, a subject of the King of Great Britain and Ireland, residing at the post town of Evansford, in the shire of Lexton, county of Talbot, State of Victoria, and Commonwealth of Australia, have invented a certain new and useful Improved Collar for Draft-Animals, of which the following is a specification.

This invention relates to those bands placed around the necks of animals, to which, or to a hame around which, the front ends of the draft straps or chains are connected.

The object of this invention is to provide a collar which may be quickly and easily applied or removed; which is light, strong and durable; which dispenses with a hame and its weight; which does not become distorted by use nor hurt the animal's shoulders when drawing heavy loads, but readily accommodates itself to whatsoever attitude the animal's shoulders may assume.

This collar is especially applicable to farm or heavy drafting of all kinds, but it is also well adapted for light work.

Referring to the drawings which form a part of this specification Figure 1 is a front elevation of a continuous open topped tubular draft piece, the bottom portion of which is flattened and acts as a hinge. Fig. 2 is a section through X—X Fig. 1. Fig. 3 is a front elevation of a continuous closed topped open bottomed tubular draft piece in the lower end of one of the sides of which is a plug or pin. Fig. 4 is a section through Y—Y Fig. 4. Fig. 5 shows a front elevation of a tubular draft piece with draft straps and rein rings in place. Fig. 6 is a side elevation of Fig. 5, looking in the direction of the arrow. Fig. 7 is an enlarged detail plan view showing a draft strap around one side of a tubular draft piece. Fig. 8 is an enlarged detail plan view showing a band around one side of a tubular draft piece and in an elongated groove of which band is a rein ring. Fig. 9 is a front elevation of an open topped collar complete, the tubular draft piece, seen in fragmentary lines, being continuous as shown in Fig. 1. Fig. 10 is a side elevation of Fig. 9. Fig. 11 is a front elevation of a closed topped open bottomed collar, the tubular draft piece, seen in fragmentary lines, being continuous as shown in Fig. 4. Fig. 12 is a side elevation of Fig. 11.

Similar numerals of reference indicate like or corresponding parts where they occur in the several views.

On reference to the drawings it will be seen that in the first two figures, 2 is an open topped continuous tubular draft piece. The tube forming the said draft piece may be of any metal or metals or combination of the same. It is preferably either of the best of iron or of steel. Its diameter depends on circumstances as also does the thickness of the wall of the said tube. In some cases the tube may be uniform in thickness. In other cases it may be thickened or reinforced where desired. The top ends 3 of the said draft piece may be open or they may be plugged or they may be inwardly closed. The lower portion of the said tubular draft piece has the upper and lower walls 4 flattened as seen in Fig. 2. These walls may meet or there may be a space existing between them. The distance between the walls depends largely upon the nature and the conditions surrounding the use of the collar, but it is such that an easily operated hinge is virtually formed.

Instead of an open topped tubular draft piece being employed, a closed topped, open bottomed tubular draft piece may be used as shown in Figs. 3 and 4. This has sides 8 united on the top by flattened walls 9. A lower end of one of the sides 8 has therein the inner end of a plug or pin 10. The outer end of the said plug or pin 10 enters freely into the open or unplugged lower end of the other tubular side 8.

Surrounding the front portion (Figs. 5, 6 and 7) of each tubular draft piece is the bowed end 18 of a draft strap. This is preferably made of metal. It can be secured to the tubular draft piece by bolts, rivets or other means, or it may be simply retained in position by a hole formed in a casing hereinafter referred to. Behind each bowed end are legs 19. In the legs are holes 20 to accommodate the front end of the usual draft connections.

Surrounding (Figs. 5, 6 and 7) each tubular draft piece and near the top end of the same is a band 21 having a semi-circular elongated groove 22 therein. Accommodated by the groove 22 is a D shaped rein ring 23.

Each continuous tubular draft piece before referred to is placed within a casing 24 as seen in Figs. 9, 10, 11, and 12. This casing is integral with the collar front 25. The casing effectually houses or protects the tubular draft piece, but may not cover it entirely as the top or bottom portions may be uncovered in some types. The casing has through each of its sides, holes to pass the legs 19 of the respective draft strap and also the rein ring band 21. The sides of the open top or the bottom of the collar may be drawn together by fastenings 30.

Having now described my invention, what I claim as new and desire to secure by Letters Patent is:—

1. In draft collars for animals, a tubular hame or draft piece bent upon itself into oval shape and flattened at its center, or closed end of the oval, said flattened portion acting as a spring to permit the ends of the hame to be sprung apart sufficiently to allow the hame to be slipped onto the animal, substantially as described.

2. In draft collars for animals, a tubular hame or draft piece bent upon itself into oval shape and flattened at its center, said flattened portion forming the closed end of the oval and acting as a spring to permit the draft piece to be opened sufficiently to be slipped onto the animal; with a collar having a front casing inclosing said tubular hame, and draft straps attached to said hame, substantially as described.

3. In draft collars for animals, a tubular hame or draft piece bent upon itself into oval shape and flattened at the closed end of the oval, said flattened portion acting as a spring to permit the ends of the hame piece to be sprung apart sufficiently to enable the hame to be slipped onto the animal; with draft straps attached to said tubular hame, and bands around said tubular hame above the draft straps, substantially as and for the purpose set forth.

4. In draft collars for animals, a tubular hame or draft piece bent upon itself into oval shape and flattened at its center, said flattened portion forming the closed end of the oval, and acting as a spring to permit the hame to be opened sufficiently to be slipped onto the animal; draft straps attached to said hame, bands around said hame above the draft straps, and a rein ring attached to each band; with a collar having a front casing inclosing said oval hame, substantially as, and for the purpose set forth.

In testimony whereof, I affix my signature in the presence of two subscribing witnesses.

COURTLAND YOUNG.

Witnesses:
 EDGAR ROBERT MARCHANT,
 CLIFFORD NICHOLSON WILLIAMS.